US 9,111,269 B2

(12) United States Patent
Ronca et al.

(10) Patent No.: US 9,111,269 B2
(45) Date of Patent: Aug. 18, 2015

(54) TRANSACTION DEVICE AND PROCESSING SYSTEM

(75) Inventors: James G. Ronca, Decatur, GA (US); Mark D. Zanzot, Huntersville, NC (US); Christopher R. Griggs, Fort Mill, SC (US); Lisa Gibson, Newnan, GA (US)

(73) Assignee: Bank of America Corporation, Charlotte, NC (US)

( * ) Notice: Subject to any disclaimer, the term of this patent is extended or adjusted under 35 U.S.C. 154(b) by 174 days.

(21) Appl. No.: 13/200,433

(22) Filed: Sep. 23, 2011

(65) Prior Publication Data

US 2013/0080270 A1    Mar. 28, 2013

(51) Int. Cl.
*G06Q 40/00* (2012.01)
*G06Q 20/00* (2012.01)
*G06Q 20/20* (2012.01)
*G06Q 20/32* (2012.01)

(52) U.S. Cl.
CPC ............ *G06Q 20/20* (2013.01); *G06Q 20/3278* (2013.01)

(58) Field of Classification Search
USPC .......................................................... 705/16
See application file for complete search history.

(56) References Cited

U.S. PATENT DOCUMENTS

| | | | |
|---|---|---|---|
| 5,955,961 A | 9/1999 | Wallerstein | |
| 6,609,654 B1 | 8/2003 | Anderson et al. | |
| 7,163,153 B2 | 1/2007 | Blossom | |
| 7,766,244 B1 | 8/2010 | Field et al. | |
| 7,936,714 B1 | 5/2011 | Karr et al. | |
| 8,396,794 B1 | 3/2013 | Mo et al. | |
| 8,768,838 B1 | 7/2014 | Hoffman | |
| 2002/0023051 A1* | 2/2002 | Kunzle et al. | 705/38 |
| 2002/0069122 A1* | 6/2002 | Yun et al. | 705/26 |
| 2003/0028483 A1* | 2/2003 | Sanders et al. | 705/40 |
| 2004/0117302 A1* | 6/2004 | Weichert et al. | 705/40 |
| 2005/0171898 A1 | 8/2005 | Bishop et al. | |
| 2006/0178986 A1* | 8/2006 | Giordano et al. | 705/40 |
| 2006/0229958 A1 | 10/2006 | Sergio et al. | |
| 2007/0114274 A1* | 5/2007 | Gibbs et al. | 235/380 |
| 2008/0010189 A1* | 1/2008 | Rosenberger | 705/39 |
| 2008/0078831 A1* | 4/2008 | Johnson et al. | 235/380 |
| 2008/0097882 A1* | 4/2008 | Rowe et al. | 705/35 |

(Continued)

OTHER PUBLICATIONS

Citi, "Rewards just got even more rewarding," Introducing the new Citi 2G Cards, 2011, 1 page, http://creditcards.citicards.com/usc/10/2g/ph1/default.htm?BT_TX+. . . , printed Sep. 26, 2011.

(Continued)

*Primary Examiner* — Ashford S Hayles
(74) *Attorney, Agent, or Firm* — Michael A. Springs (57) ABSTRACT

According to some embodiments, a transaction device for performing a transaction between a customer and a merchant comprises an account selection engine and a communication link. The account selection engine operable to receive information identifying at least one characteristic of a proposed transaction, identify a plurality of accounts associated with the customer, and select a first account from among the plurality of accounts based on the at least one characteristic. The communication link is operable to transmit identification of the first account to a point of sale interface of a transaction device, the point of sale interface operable to transmit a transaction request to a point of sale receiver associated with the merchant, the transaction request comprising an account number associated with the first account.

20 Claims, 6 Drawing Sheets

(56) References Cited

U.S. PATENT DOCUMENTS

| | | | |
|---|---|---|---|
| 2008/0215887 A1 | 9/2008 | Hart et al. | |
| 2008/0277465 A1* | 11/2008 | Pletz et al. | 235/379 |
| 2008/0301041 A1 | 12/2008 | Bruk | |
| 2009/0006212 A1 | 1/2009 | Krajicek et al. | |
| 2009/0006262 A1 | 1/2009 | Brown et al. | |
| 2009/0018955 A1* | 1/2009 | Chen et al. | 705/39 |
| 2009/0037275 A1 | 2/2009 | Pollio | |
| 2009/0037333 A1* | 2/2009 | Flitcroft et al. | 705/44 |
| 2009/0119204 A1* | 5/2009 | Akella et al. | 705/39 |
| 2009/0192904 A1* | 7/2009 | Patterson et al. | 705/17 |
| 2009/0192913 A1* | 7/2009 | Saito et al. | 705/26 |
| 2009/0240622 A1* | 9/2009 | Zandonadi | 705/40 |
| 2009/0276368 A1* | 11/2009 | Martin et al. | 705/36 R |
| 2009/0292642 A1* | 11/2009 | Han | 705/71 |
| 2009/0313110 A1 | 12/2009 | Asai et al. | |
| 2010/0057553 A1 | 3/2010 | Ameiss et al. | |
| 2010/0100469 A1* | 4/2010 | Buchanan et al. | 705/35 |
| 2010/0179888 A1* | 7/2010 | Warren et al. | 705/27 |
| 2010/0262503 A1 | 10/2010 | Florek et al. | |
| 2010/0262537 A1* | 10/2010 | Park | 705/39 |
| 2010/0293101 A1 | 11/2010 | Walker et al. | |
| 2010/0306103 A1* | 12/2010 | Hankins et al. | 705/40 |
| 2011/0078079 A1 | 3/2011 | Shin | |
| 2011/0078082 A1* | 3/2011 | Gupta | 705/44 |
| 2011/0131128 A1 | 6/2011 | Väänänen | |
| 2011/0153402 A1* | 6/2011 | Craig | 705/14.27 |
| 2011/0184867 A1 | 7/2011 | Varadarajan | |
| 2011/0289001 A1 | 11/2011 | Bishop et al. | |
| 2012/0078701 A1 | 3/2012 | Woods | |
| 2012/0101882 A1 | 4/2012 | Todd | |
| 2012/0130797 A1 | 5/2012 | Shin | |
| 2012/0143759 A1* | 6/2012 | Ritorto et al. | 705/44 |
| 2012/0158565 A1 | 6/2012 | Iqbal | |
| 2012/0166264 A1* | 6/2012 | Shum et al. | 705/14.17 |
| 2012/0221471 A1* | 8/2012 | Akella et al. | 705/44 |
| 2012/0232968 A1 | 9/2012 | Calman et al. | |
| 2012/0265625 A1* | 10/2012 | Pletz et al. | 705/16 |
| 2012/0284105 A1* | 11/2012 | Li | 705/14.23 |
| 2012/0284177 A1* | 11/2012 | Mukherjee | 705/40 |
| 2013/0030889 A1 | 1/2013 | Davich et al. | |
| 2013/0304561 A1 | 11/2013 | Warner et al. | |
| 2014/0081855 A1* | 3/2014 | Hankins et al. | 705/40 |

OTHER PUBLICATIONS

Dynamics Inc., "Dynamic Credit Card™," 2 pages, 2011, http://poweredcards.com/products_dynamic_cc.php, printed Sep. 26, 2011.

Dynamics Inc., "Hidden®," 1 page, 2011, http://www.poweredcards.com/products_hidden.php, Printed Sep. 26, 2011.

Dynamics Inc., "MultiAccount™," 1 page, 2011, http://www.poweredcards.com/products_multi.php, Printed Sep. 26, 2011.

Dynamics Inc., "Redemption®," 1 page, 2011, http://www.poweredcards.com/redemption.php, printed Sep. 26, 2011.

Bank of America, "SafePass®: Online Banking Security Enhancements—What is SafePass?," 2 pages, 2011, http://www.bankofamerica.com/privacy/index.cfm?template=learn_a. . . . , printed Sep. 26, 2011.

Bank of America, "SafePass®: Online Banking Security Enhancements—How it Works," 2 pages, 2011, http://www.bankofamerica.com/privacy/index.cfm?template=learn_a . . . , printed Sep. 26, 2011.

Bank of America, "ShopSafe® Service—What is ShopSafe?," 1 pages, http://www.bankofamerica.com/privacy/index.cfm?template=learn_a . . . , printed Sep. 26, 2011.

Bank of America, "ShopSafe® Service—How It Works," 1 pages, http://www.bankofamerica.com/privacy/index.cfm?template=learn_a . . . , printed Sep. 26, 2011.

U.S. Appl. No. 13/200,454, entitled, "Managing a Universal Payment Account," filed Sep. 23, 2011.

U.S. Appl. No. 13/200,482, entitled, "Transaction Device and Processing System," filed Sep. 23, 2011, 40 pages.

U.S. Appl. No. 13/200,455, entitled, "Transaction Device and Processing System," filed Sep. 23, 2011.

U.S. Appl. No. 13/200,439, entitled, "Transaction Device and Processing System," filed Sep. 23, 2011, 40 pages.

U.S. Patent and Trademark Office Official Action in U.S. Appl. No. 13/200,439, dated Dec. 6, 2012, 16 pages.

U.S. Patent and Trademark Office Official Action in U.S. Appl. No. 13/200,482, dated Nov. 2, 2012, 11 pages.

U.S. Patent and Trademark Office Official Action in U.S. Appl. No. 13/200,455, dated Dec. 18, 2012, 13 pages.

U.S. Patent and Trademark Office Official Action in U.S. Appl. No. 13/200,482, dated May 10, 2013, 13 pages.

U.S. Patent and Trademark Office Official Action in U.S. Appl. No. 13/200,439, dated May 20, 2013, 18 pages.

U.S. Patent and Trademark Office Official Action in U.S. Appl. No. 13/200,455, dated Jun. 6, 2013, 14 pages.

Ronca, U.S. Appl. No. 13/200,482, Non-Final Office Action dated Oct. 3, 2014.

Ronca, U.S. Appl. No. 13/200,439, Non-Final Office Action dated Oct. 15, 2014.

Ronca, U.S. Appl. No. 13/200,482, Non-Final Office Action dated Oct. 7, 2014.

* cited by examiner

TRANSACTION DEVICE AND PROCESSING SYSTEM

TECHNICAL FIELD

The present disclosure relates to transactions between merchants and customers and, more specifically, to transaction devices and processing systems.

BACKGROUND

A merchant is a provider of goods or services. Merchants may provide goods or services to customers or to other merchants. A retailer is a merchant that provides goods or services to customers. A wholesaler is a merchant that provides goods or services to other merchants. A merchant execute transactions with customers or other merchants at a facility with point-of-sale equipment.

SUMMARY

According to some embodiments, a transaction device for performing a transaction between a customer and a merchant comprises an account selection engine and a communication link. The account selection engine operable to receive information identifying at least one characteristic of a proposed transaction, identify a plurality of accounts associated with the customer, and select a first account from among the plurality of accounts based on the at least one characteristic. The communication link is operable to transmit identification of the first account to a point of sale interface of a transaction device, the point of sale interface operable to transmit a transaction request to a point of sale receiver associated with the merchant, the transaction request comprising an account number associated with the first account.

Certain embodiments of the invention may provide one or more technical advantages. A technical advantage of one embodiment may include the capability to reduce security risks associated with transactions with a merchant. A technical advantage of one embodiment may include the capability to generate a temporary-use number that limits a criminal's opportunity to execute transactions against an account without the account holder's authorization. A technical advantage of one embodiment may include the capability to provide a single transaction device with the ability to execute transactions from multiple accounts. A technical advantage of one embodiment may include the capability to select an account number from among multiple accounts for use in a transaction. A technical advantage of one embodiment may include the capability to evaluate transactions between a customer and a merchant.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An enterprise may include any individual, business, or organization. One example of an enterprise may include a financial enterprise. A financial enterprise may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a client's portfolio.

A financial enterprise may provide a variety of financial products and services. Examples of financial products and services may include, but are not limited to, account services such as maintaining accounts, receiving deposits, crediting accounts, debiting accounts, extending credit, purchasing securities, providing insurance, and portfolio management. A financial enterprise may provide financial products and services to clients. For example, a financial enterprise may maintain an account for a client. Examples of an account may include, but are not limited to, a prepaid account, a checking account, a savings account, and a credit account (such as a credit card account). The client may perform a variety of activities using the account, including executing transactions, contributing funds to the account, withdrawing funds from the account, managing the account, and being responsible or liable for account transactions.

Another example of an enterprise may include a merchant. A merchant may provide goods and services to customers. The merchant and customer may be clients of the same or different financial enterprises. The customer may acquire goods and services by agreeing to a transaction with the merchant. Pursuant to this transaction, the customer may be obligated to transfer funds to the merchant. One or more financial enterprises may assist the merchant and customer with completing the transaction. For example, if the customer intends to use a credit card issued by the customer's financial enterprise, the customer may present the credit card to the merchant as part of a request to acquire goods or services. The merchant may submit the request to the merchant's financial enterprise, sometimes known as the "acquirer" or "acquiring bank." The merchant's financial enterprise may send a request to the customer's financial enterprise, sometimes known as the "issuer" or "issuing bank," to authorize the transaction. In this example, the customer's financial enterprise may provide an authorization code to the merchant's financial institution if valid credit is available, and the merchant's financial institution may authorize the merchant to complete the transaction. After the transaction is complete, the merchant may receive the funds from the customer's financial enterprise through the merchant's financial enterprise, and the customer's financial enterprise may receive reimbursement from the customer when the customer pays the credit card bill.

In this example, the customer selects a credit card and presents the credit card to the merchant. The customer may have additional credit cards issued by the same or different financial enterprises, as well as other accounts such as a checking account, a savings account, and a prepaid account. The customer may execute transactions from these accounts using items such as a card or a checkbook. In order for the customer to execute transactions using these different accounts, the customer may be required to carry an item such as a card or checkbook for each different account. Carrying multiple cards and/or checkbooks may force the customer to carry a thick wallet or a heavy purse. In addition, the customer may not have the necessary information available to make an informed decision on which card or checkbook to use. For example, the customer may not know the account balances and due dates associated with each account. Teachings of certain embodiments recognize that providing a single transaction device with the ability to recommend accounts and execute transactions using multiple accounts may improve the customer's shopping experience.

Each of the customer's accounts may have an account number. An account number may include any number (or other combination of characters) that may be used to identify an account during a transaction. Typical accounts have a single, permanent number that identifies the account. Returning to the previous credit card example, the credit card may include a credit card number that identifies the credit account associated with the credit card. In this example, the credit card number may be provided on the front of the card and encoded in a magnetic strip on the back of the card. If the customer wants to change the credit card number, the customer's financial enterprise may require the customer to open a new credit card account and/or request a new credit card.

Accounts having a single, permanent account number present potential security risks. If a criminal discovers the permanent account number, the criminal may be able to execute transactions against the account without the customer's authorization. Accordingly, teachings of certain embodiments recognize that obfuscating the permanent account number may reduce security risks. For example, a transaction device may generate an obfuscated account number associated with the permanent account number. This obfuscated account number be a temporary-use number that limits the criminal's opportunity to execute transactions against the account without the customer's authorization.

Figure 1:
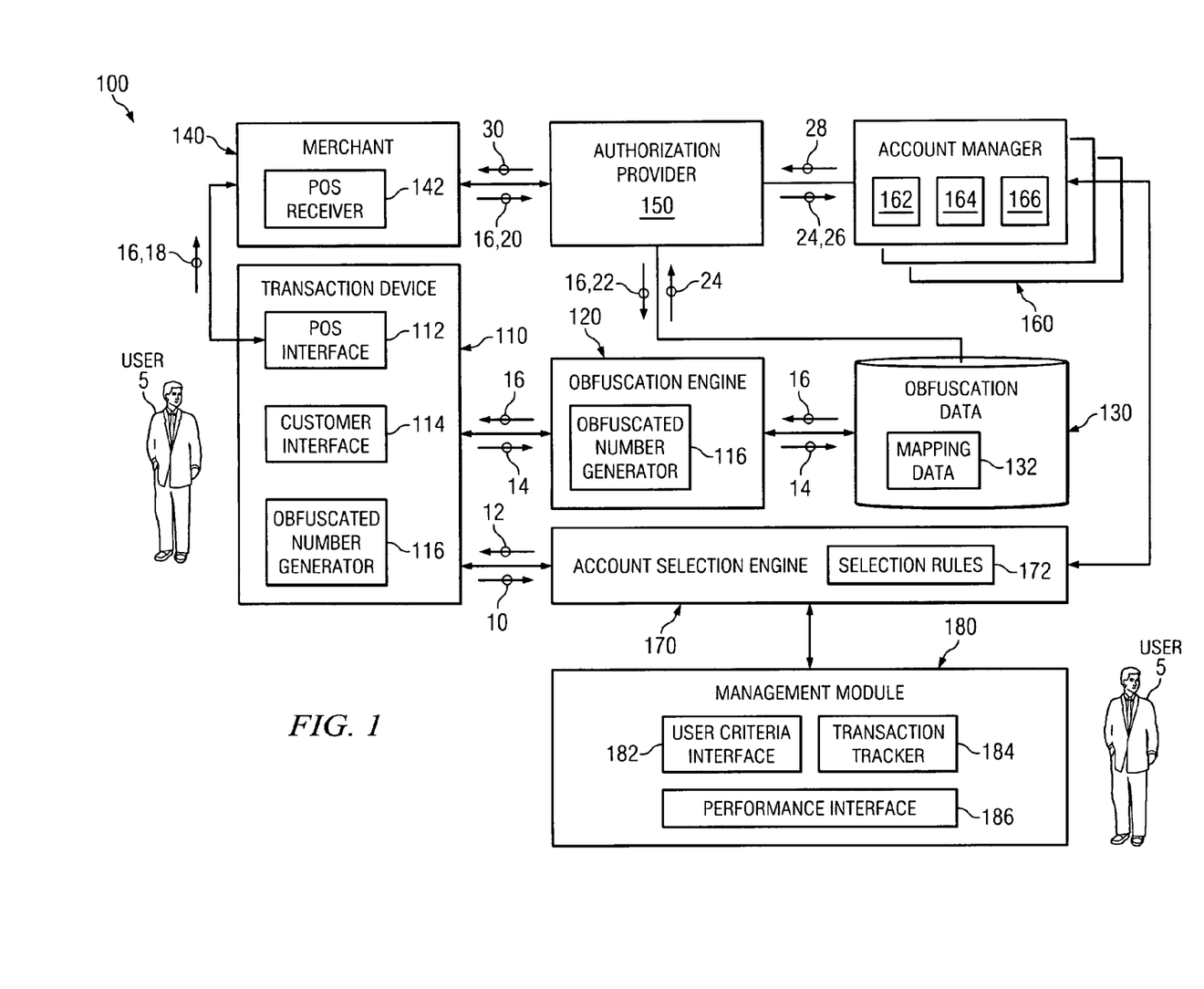
FIG. 1 shows a transaction processing system according to one embodiment.

FIG. 1 shows a transaction processing system 100 according to one embodiment. The transaction processing system 100 of FIG. 1 features a transaction device 110, an obfuscation engine 120, an obfuscation repository 130, a merchant 140, an authorization provider 150, an account manager 160, an account selection engine 170, and a management module 180.

Transaction processing system 100 may be implemented on one or more computer systems 910 and may include and/or communicate across one or more networks 30. Computer systems 910 and networks 30 are described in greater detail below with regard to FIG. 9.

Users 5 may include any individual, group of individuals, entity, machine, and/or mechanism that interacts with transaction processing system 100. Users 5 are described in greater detail below with regard to FIG. 9. Examples of user 5 may include customers, merchants, and financial enterprises. The example shown in FIG. 1 features a customer user that interacts with transaction device 110 and management module 180. Teachings of certain embodiments recognize, however, that a variety of users 5 may interact with transaction processing system 100.

Transaction device 110 is a device associated with a customer for executing transactions. Transaction device 110 enables the customer to provide financial information to a merchant as part of a transaction. In some embodiments, transaction device 110 is a handheld device, such as a spending card or a handheld electronic device. Examples of a handheld electronic device may include a digital assistant, such as a personal digital assistant or an enterprise digital assistant; a mobile phone, such as a smartphone or feature phone; a portable computer, such as a laptop computer or tablet device; a portable media player; a portable game console; a digital camera, such as a digital still camera or digital video camera; and a personal navigation device.

In the example of FIG. 1, transaction device 110 includes a point-of-sale ("POS") interface 210, a customer interface 114, and an obfuscated number generator. POS interface 210 enables communication between transaction device 110 and a POS receiver associated with a merchant, such as POS receiver 142. For example, the customer may present transaction device 110 to a merchant, and POS interface 210 may transmit account information to the POS receiver 142 associated with the merchant. Account information may include any data that may identify an account (e.g., an account number), identify an authorized user of a financial account, indicate authorization to use a financial account, be utilized in executing a financial transaction involving an account, or is otherwise associated with an account (e.g., expiration date, card verification value (CVV), pin number, discretionary data, or other data associated with a financial account). In one embodiment, POS interface 210 may be enabled to communicate account data for one account to a data stripe reader. In other embodiments, POS interface 210 may communicate different account data for different transactions. For example, POS interface 210 may communicate account data associated with a plurality of accounts, such as one or more credit, debit, checking, savings, or other accounts.

One example of a POS interface 210 may include a data stripe. A data stripe may be operable to communicate transaction information to a data stripe reader. Data stripes may include magnetic stripes, such as those found on credit or debit cards, dynamic programmable stripes such as those found on dynamic cards, or any other storage medium operable to communicate account data to a data stripe reader. In one embodiment, a data strike may be enabled to communicate account data for one account to a data stripe reader. In other embodiments, a data stripe may communicate different account data for different transactions. For example, a data stripe may communicate account data associated with a plurality of accounts, such as one or more credit, debit, checking, savings, or other accounts. In some embodiments, the data stripe is a programmable data stripe, wherein the account data communicated by data stripe is dynamic and can be changed at any time.

Another example of a POS interface 210 may include a wireless transmitter. In this example, POS interface 210 may wirelessly transmit account information to POS receiver 142. POS interface 210 may transmit account information using any suitable communication technique, including, but not limited to, near-field communication, Bluetooth communication, radio-frequency identification (RFID) communication, wireless network communication (e.g., IEEE 802.11 communication), and cellular network communication. POS interface 210 may transmit account information across a network such as network 930 of FIG. 9.

Another example of a POS interface 210 may include a barcode generator. In this example, POS interface 210 may generate a barcode readable by a bar code scanner. In some embodiments, POS interface 210 may be operable to display a unique barcode for different transactions. Each unique barcode may represent different account data, such as different account numbers. In some embodiments, account data communicated by the barcode generator may be dynamic and may be changed at any time.

In the example of FIG. 1, transaction device 110 includes customer interface 114. Customer interface 114 provides an interface for receiving instructions from the customer. In some embodiments, customer interface 114 may include both an input component (e.g., buttons, a keyboard or keypad, a touchpad or touchscreen, a microphone, a gyroscope) and an output or display component (e.g., a display device, key or button labels, interactive interface software). Customer interface 114 may receive any suitable instructions from the customer. In one example, customer interface 114 may allow the customer to select an account from a plurality of accounts and to authorize a transaction from that account.

Some embodiments of transaction device 110, however, may not include a customer interface 114 such as a keypad or touchpad. For example, in one embodiment, account selection engine 170 may automatically select an account from a plurality of accounts without receiving a selection from the customer through the transaction device. As one example, the POS interface 210 may have near-field communication capability, and the customer may initiate a transaction by providing transaction device 110 near a merchant's near-field communication reader. In this example, transaction device 110 may provide an account number to the merchant without the customer inputting an account selection to the transaction device.

In the example of FIG. 1, transaction device 110 includes obfuscated number generator 116. Obfuscated number generator 116 generates an obfuscated account number associated with an account's permanent account number. The obfuscated account number may represent a temporary-use number associated with the account's permanent account number. For example, a credit card may include a permanent credit card number that identifies the credit account associated with the credit card. In this example, the permanent credit card number may be provided on the front of the card and encoded in a magnetic strip on the back of the card. If the customer wants to change the permanent credit card number, the customer's financial enterprise may require the customer to open a new credit card account and/or request a new credit card. Obfuscated number generator 116, however, may generate a temporary-use obfuscated account number associated with the permanent credit card number. This obfuscated account number may have the same format as the permanent credit card number. For example, an obfuscated account number for a credit card account may be 15 or 16 digits.

The obfuscated account number may be provided to the merchant instead of the permanent account number. Teachings of certain embodiments recognize that obfuscating the permanent account number may reduce security risks. For example, a temporary-use number that limits the criminal's opportunity to execute transactions against the account without the customer's authorization. As one example, the obfuscated account number may be limited to a single transaction. In this example, a criminal working at the merchant's location may be unable to use the obfuscated account number for a second, unauthorized transaction.

In the example of FIG. 1, obfuscated number generator 116 is located within transaction device 110. In some embodiments, obfuscated number generator 116 may be located remote from transaction device 110. Teachings of certain embodiments recognize that locating the obfuscated number generator 116 remote from transaction device 110 may improve security by denying transaction device 110 access to the permanent account numbers. If transaction device 110 is stolen, for example, the thief would not have access to the permanent account numbers.

In FIG. 1, obfuscation engine 120 also features an obfuscated number generator 116. Obfuscation engine 120 may communicate with transaction device 110 in any suitable manner, including across a network such as network 930 of FIG. 9. In some embodiments, both transaction device 110 and obfuscation engine 120 may include an obfuscated number generator 116. In other embodiments, one or neither component may include an obfuscated number generator 116.

In some embodiments, obfuscation engine 120 may provide a obfuscated number in response to a request from transaction device 110. For example, transaction device 110 may request an obfuscated number when the customer engages in a transaction. In this example, transaction device 110 may transmit the request across a network such as network 930 of FIG. 9, and obfuscation engine 120 may return the requested obfuscated number across the same network.

Figure 9:
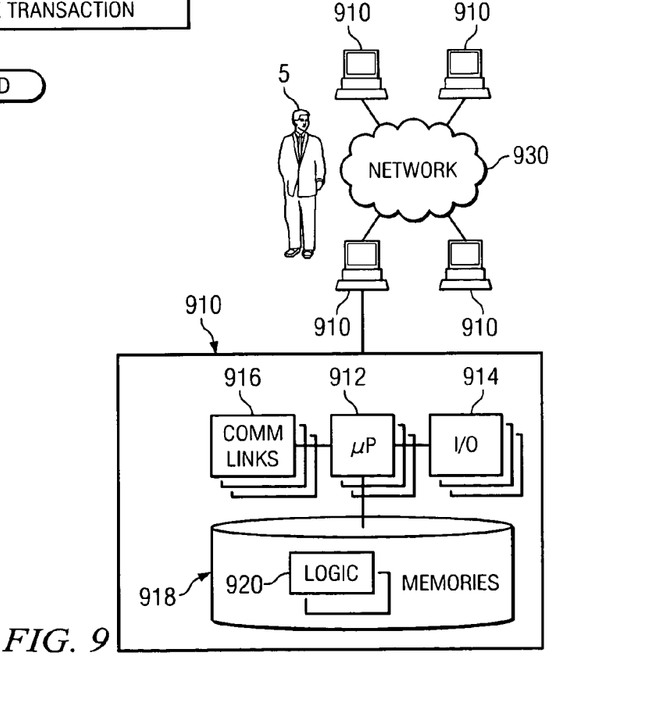
FIG. 9 shows a user, computer systems, and a network according to one example embodiment.

In some circumstances however, transaction device 110 is not connected to obfuscation engine 120 across a network such as network 930 of FIG. 9 when the customer engages in a transaction. For example, transaction device 110 may not have network capability, or the customer may wish to engage in a transaction outside of the network (e.g., the customer is traveling internationally where a suitable network is unavailable). In this scenario, transaction device 110 may download one or more obfuscated numbers from obfuscation engine 120 prior to engaging in a transaction. For example, obfuscation engine 120 may load the transaction device 110 with a number of obfuscated numbers (e.g., one-hundred obfuscated numbers for one-hundred transactions or thirty obfuscated numbers for thirty days of transactions).

In some embodiments, obfuscated number generator 116 may generate obfuscated numbers based on state information. For example, obfuscated number generator 116 may generate obfuscated numbers unique to a particular period of time or time of day. As another example, obfuscated number generator 116 may generate obfuscated numbers unique to a particular transaction device 110. Teachings of certain embodiments recognize that generating obfuscated numbers based on state information may improve security.

In some embodiments, obfuscated number generator 116 may apply rules to prevent obfuscated number generating 116 from assigning the same obfuscated number to multiple permanent numbers, accounts, customers, and/or transaction devices. For example, obfuscated number generator 116 may apply rules such that each obfuscated number is unique to a particular permanent number, account, customer, and/or transaction device. Obfuscated number generator 116 may also consult a list of previously-assigned obfuscated numbers to determine whether the generated obfuscated number is unique. In some embodiments, a generated obfuscated number may become available to be reassigned once the obfuscated number has been used in a transaction.

In some embodiments, obfuscated number generator 116 generates obfuscated numbers by creating new combinations of numbers. In other embodiments, obfuscated number generator 116 generates obfuscated numbers by retrieving an obfuscated number from a list of available obfuscated numbers. For example, obfuscation engine 120 may be associated with an enterprise that owns a group of obfuscated numbers, such as a group of obfuscated credit card numbers. In this example, obfuscation engine 120 may select an obfuscated number from the group of obfuscated credit card numbers.

Obfuscation repository 130 stores obfuscation mapping data 132. Obfuscation mapping data 132 stores the relationship between obfuscated account numbers and permanent account numbers. For example, when obfuscated number generator 116 generates a new obfuscated account number, obfuscated number generator 116 informs obfuscation repository 130 of the relationship between the new obfuscated account number and the permanent account number. When the customer presents the obfuscated account number to the merchant, a party such as the merchant's bank may retrieve the associated permanent account number from the obfuscated mapping data 132.

Merchant 140 represents a provider of goods or services. In the example of FIG. 1, merchant 140 includes POS receiver 142. POS receiver 142 enables communication between the POS interface 210 of transaction device 110. For example, POS receiver 142 may receive account information from transaction device 110 through POS interface 210. Examples of POS receiver 142 may include, but are not limited to, a data stripe reader, a wireless receiver, and a bar code scanner.

Authorization provider 150 provides authorization to merchant 140 to complete the transaction. In some circumstances, authorization provider 150 may be associated with a financial enterprise, such as the acquiring bank of merchant 140. In some embodiments, authorization provider 150 communicates with obfuscation repository 130 to identify the permanent account number for an obfuscated account number received by merchant 140. In some circumstances, authorization from authorization provider 150 confirms that authorization provider 150 will pay merchant 140 for the transaction executed with the customer.

Account manager 160 maintains accounts of the customer. In some circumstances, account manager 160 may be associated with a financial enterprise, such as the issuing bank of the customer. In the example embodiment, account manager 160 maintains three accounts 162, 164, and 166. Examples of accounts 162, 164, and 166 may include, but are not limited to, transaction accounts, savings accounts, credit accounts, investment accounts, and insurance accounts.

Account manager 160 may also provide approval of a transaction to authorization provider 150. In some embodiments, authorization provider 150 communicates with obfuscation repository 130 to identify the permanent account number for an obfuscated account number received by merchant 140. In some circumstances, approval from account manager 160 confirms that account manager 160 will pay authorization provider 150 for the transaction executed with the customer. Account manager 160 may provide this approval, for example, if account manager 160 determines that the selected account has sufficient funds or credit available.

Account selection engine 170 recommends an account to the customer for a transaction. In some embodiments, account selection engine 170 may receive information identifying characteristics of a proposed transaction from transaction device 110 and use this information to identify a recommended account. Examples of characteristics may include, but are not limited to, the customer, the merchant (e.g., merchant name, merchant category), the amount, the goods and/or services to be sold (e.g., product name, product category), and the day and/or time of the proposed transaction.

Account selection engine 170 may identify a recommended account based on the characteristics of the proposed transaction. Account selection engine 170 may, for example, compare the characteristics to selection criteria. Examples of selection criteria may include, but are not limited to, amount of rewards associated with using an account, amount of fees associated with an account, and amount of owed interest associated with an account, amount of earned interest associated with an account. Account selection 170 may also, for example, compare the characteristics to account statuses associated with each account. Examples of account statuses may include, but are not limited to, minimum account balance, maximum account balance, and amount of time between the time of the transaction and the time payment is due on the account.

In some embodiments, account selection engine 170 may identify a recommend account by applying selection rules 172. Selection rules 172 may identify which accounts should be recommended depending on various combinations of proposed-transaction characteristics, selection criteria, and account statuses. One example rule may state that a particular account is recommended for fuel purchases because that particular account offers 3% cash back on fuel purchases. Another example rule may state that a particular account is recommended for international purchases because that particular account offers reduced foreign transaction fees. Another example rule may state that a particular account is recommended because payment is not due for a long time from the time of the transaction. Another example rule may state not to use a particular account if the customer is reaching the maximum balance owed on that account. Another example rule may state to use a particular account if the customer is required to use the particular account a certain number of times in order to receive better services, such as better interest rates or better rewards. In some embodiments, account selection engine 170 may also consider administrative preferences, such as costs or benefits to the financial institution or the speed of payment clearance.

In some circumstances, multiple rules may result in a contradiction. For example, one rule may recommend a first account because of the first account's rewards program, but a second rule may recommend a second account because payment is due on the second account later than on the first account. Accordingly, teachings of certain embodiments recognize the capability to prioritize and/or weight rules to resolve conflicts. For example, account selection engine 170 may prioritize payment due dates over reward programs and therefore prioritize the second rule over the first rule.

In some embodiments, each rule may be placed in a category, and categories of rules may be prioritized over others. In one example, rule categories may include mandatory rules, preferential rules, and optimal rules. In this example, mandatory rules can never be broken, preferential rules should not be broken, and optimal rules should be applied when possible.

An example of a mandatory rule might be that the customer cannot exceed the maximum balance on a particular account. An example of a preferential rule might be that lower-interest credit card accounts should be prioritized over higher-interest credit card accounts. An example of an optimal rule might be that airline rewards programs should be prioritized over cash-back rewards programs.

In some circumstances, rules, prioritizations, and weights may be unique to a particular customer or groups of customers. Returning to the previous example, account selection engine 170 may prioritize rewards programs over payment due dates if the customer is a mass affluent customer with available resources to meet shorter payment due dates. In this example, account selection engine 170 may determine that the customer is a mass affluent customer, for example, by reviewing the individual resources of the customer or by identifying the customer as having been previously classified as a mass affluent customer. Account selection engine 170 might apply a different prioritization, for example, if the customer was classified in a different category such as teenager or low-income.

In some circumstances, the customer may provide user criteria that instructs account selection engine 170 on how to apply rules. For example, the customer may instruct account selection engine 170 to prioritize rewards programs with airline travel bonuses if the customer is planning on taking a vacation. As another example, the customer may instruct account selection engine 170 to prioritize credit card interest rate over rewards programs.

In the example of FIG. 1, account selection engine 170 is shown as remote from transaction device 110. In this example, transaction device 110 may communicate across a network, such as network 930 of FIG. 9, with account selection engine 170. In some circumstances however, transaction device 110 is not connected to account selection engine 170 across a network such as network 930 of FIG. 9 when the customer engages in a transaction. For example, transaction device 110 may not have network capability, or the customer may wish to engage in a transaction outside of the network (e.g., the customer is traveling internationally where a suitable network is unavailable). In this scenario, account selection engine 170 may be included within transaction device 110. For example, account selection engine 170 may consult selection rules 172 stored on the transaction device 110.

Management module 180 enables the customer or another user 5 to manage and evaluate various aspects of transaction processing system 100. In the example of FIG. 1, management module 180 includes user criteria interface 182, transaction tracker 184, and performance interface 186. User criteria interface 182 provides an interface for a user 5, such as the customer, to provide user criteria on the existence, prioritization, and/or weights of selection rules 172. As one example, user criteria interface 182 may allow user 5 to provide comparative weightings between various rules or other priorities. For example, prioritizing interest rate may instruct account selection engine 170 to prioritize those accounts with optimal interest rates. As another example, user criteria interface 182 may allow user 5 to provide custom rules. An example of user criteria interface 182 is described in greater detail with regard to FIG. 4.

Transaction tracker 184 presents information regarding transactions of the customer, such as transaction amount, merchant, and goods and/or services sold. Performance interface 186 evaluates the customer's transactions to determine whether the customer would have received a financial benefit by using a different account than the one used during the transaction. For example, performance interface 186 may compare the account used in a transaction identified by transaction tracker 184 with an account recommended for the transaction by account selection engine 170. Performance interface 186 may inform the customer, for example, that using the recommended account may save the customer money.

In some embodiments, performance interface 186 may compare the account used in a transaction with accounts not currently held by the customer. For example, performance interface 186 may recommend new accounts that would have saved or earned the customer money had the customer used the account on previous transactions. As one example, performance interface 186 may recommend that the customer enroll for a new credit card with cash rewards on fuel purchases if the customer spent certain amounts of money on fuel purchases.

In some embodiments, performance interface 186 may compare the account used in a transaction with a changed version of the same account used in the transaction. For example, performance interface 186 may recommend that the customer change the account if the change would have saved or earned the customer money. As one example, performance interface 186 may recommend that the customer enable a rewards program on an existing account if the rewards program would have saved or earned the customer money.

In some embodiments, performance interface 186 may report evaluations of the customer's transactions on a transaction-by-transaction basis. In some embodiments, performance interface 186 may provide summaries of these evaluations, such as summaries of the customer's transactions over a certain period of time. In some embodiments, performance interface 186 may identify a list of proposed changes or additions, such as changes to the customer's accounts and/or selection rules 172. In these embodiments, performance interface 186 may also identify an amount of savings or earnings associated with each proposed change or addition. An example of performance interface 186 is described in greater detail with regard to FIG. 5.

In some embodiments, performance interface 186 may evaluate the customer's user criteria. For example, performance interface 186 may compare performance using the customer's user criteria with default criteria and recommend changes to the customer's user criteria. As one example, the customer may believe that interest rate should be prioritized, but the customer may not be aware that the customer would earn more money by prioritizing rewards programs because the customer routinely pays off owed accounts before interest becomes due.

In operation, according to one example embodiment, transaction device 110 transmits a transaction proposal 10 to account selection engine 170. Transaction proposal 10 identifies characteristics of a proposed transaction. Examples of characteristics may include, but are not limited to, the customer, the merchant (e.g., merchant name, merchant category), the amount, the goods and/or services to be sold (e.g., product name, product category), and the day and/or time of the proposed transaction.

Account selection engine 170 provides an account recommendation 12 in response to transaction proposal 10. In some embodiments, account selection engine 170 may identify a recommend account by applying selection rules 172. Selection rules 172 may identify which accounts should be recommended depending on various combinations of proposed-transaction characteristics, selection criteria, and account statuses. In this example, account selection engine 170 recommends account 162.

An account may be selected for a transaction between transaction device 110 and merchant 140. In one example, the account identified by account recommendation 12 is automatically selected without input from the customer. In another example, transaction device 110 presents account recommendation 12 to the customer and allows the customer to either accept the account recommendation 12 or select an alternative account. In another example, transaction device 110 allows the customer to select an account without informing the customer of account recommendation 12. In this example, the recommended account 162 is also the selected account.

After account 162 is selected, transaction device 110 transmits obfuscation request 14 to obfuscated number generator 116. Obfuscation request 14 represents a request for an obfuscated account number for the selected account 162. Obfuscated number generator 116 provides an obfuscated account number 16. Obfuscated account number 16 is a temporary-use number associated with the selected account 162.

Transaction device 110 transmits obfuscated account number 16 and a transaction request 18 to merchant 140. Transaction request 18 represents a request to execute a transaction between the customer and merchant 140. For example, transaction request 18 may represent a request of the customer to acquire goods and/or services from merchant 140. In this example, transaction request 18 specifies that the customer will fund the requested transaction by providing funds from the selected account 162 associated with obfuscated account number 16.

In this example, merchant 140 transmits obfuscated account number 16 and an authorization request 20 to authorization provider 150. Authorization request 20 represents a request for authorization to execute the requested transaction. For example, authorization provider 150 may be associated with a financial enterprise, such as the acquiring bank of merchant 140. In this example, merchant 140 may seek authorization from authorization provider 150 because authorization provider 150 may be responsible for accepting payments for products or services on behalf of merchant 140. For example, an acquiring bank may accept credit and debit card payments on behalf of merchant 140.

Authorization module 150 may grant or deny authorization to merchant 140 depending on whether authorization module 150 expects that the customer will transfer funds from the selected account 162. Authorization module 150 may base this expectation on approval from account manager 160.

In this example, authorization provider 150 transmits obfuscated account number 16 and an account number request 22 to obfuscation repository 130. Account number request 22 represents a request to determine the permanent account number associated with obfuscated account number 16. Obfuscation repository 130 consults mapping data 132 to identify the account number 24 associated with obfuscated account number 16. In this example, account number 24 is the permanent account number of selected account 162. Obfuscation repository 130 transmits account number 24 to authorization provider 150.

Authorization provider 150 transmits account number 24 and an approval request 26 to account module 160. Approval request 26 represents a request to approve a transaction from selected account 162 on behalf of the customer. Account manager 160 may approve the transaction, for example, if account 162 has sufficient funds and/or credit available to complete the transaction. Account manager 160 may also require some level of authentication showing that the customer is in fact the holder of account 162. For example, account manager 160 may require authorization criteria, such as a passcode or verification from merchant 140 that the customer's identity matches the identity of the holder of account 162.

In this example, account manager 160 approves the transaction by transmitting an approval 28 to authorization module 150. Authorization module 150 then transmits authorization 30 to merchant 140 based on receipt of approval 28. Merchant 140 then executes the transaction with the customer. Merchant 140 may reconcile the transaction and receive funds from account 162 through authorization module 150 and account manager 160. For example, account manager 160 may provide funds from account 162 to authorization module 150, which then provides the funds to merchant 140.

Figure 2:
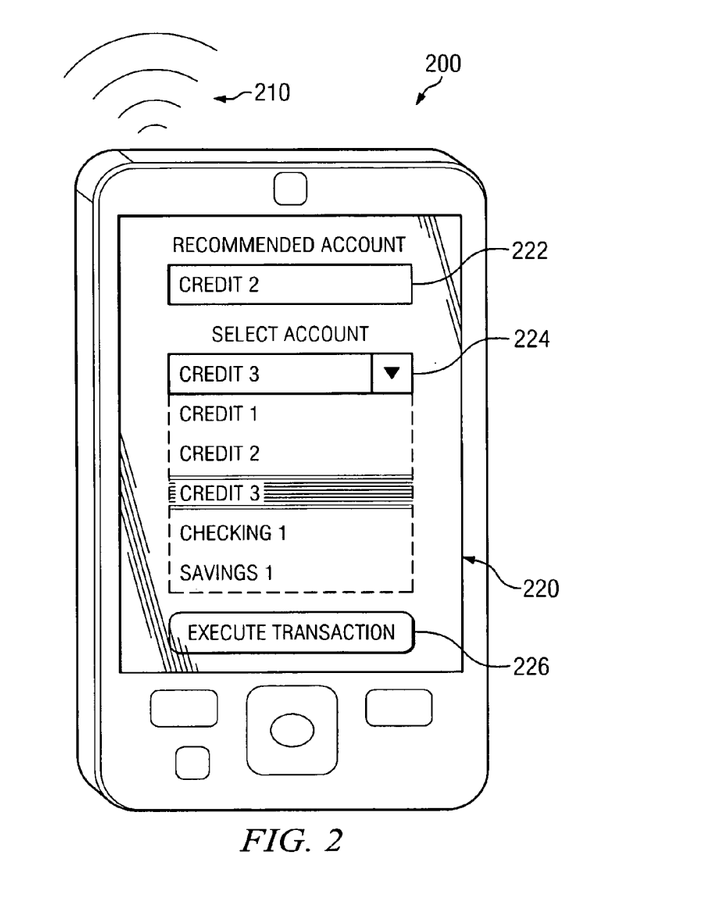
FIG. 2 shows a transaction device according to one embodiment.

FIG. 2 shows a transaction device 200 according to one embodiment. Transaction device 200 represents an example of transaction device 110. In the example of FIG. 2, transaction device 200 features a POS interface 210 and a customer interface 220. POS interface 210 and customer interface 220 represent an examples of POS interface 210 and customer interface 114. In the example of FIG. 2, POS interface 210 is a wireless transmitter operable to wirelessly transmit account information to a POS receiver, such as POS receiver 142. Also in this example, customer interface 114 represents software running on a handheld electronic device.

In this example, customer interface 114 presents a recommended account field 222, an account selection field 224, and an execute transaction field 226 to user 5. Recommended account field 222 presents a recommended account for the customer. In some embodiments, recommended account field 222 may display the account recommended by account selection engine 170. Account selection field 224 provides an interface for receiving an account selection from user 5. In this example, account selection field 224 allows user 5 to select an account other than the recommended account shown in recommended account field 222. Execute transaction field 226 provides an interface for receiving instructions from user 5 to execute a transaction using the account selected in account selection field 224.

Another example of a POS interface 210 may include a wireless transmitter. In this example, POS interface 210 may wirelessly transmit account information to POS receiver 142. POS interface 210 may transmit account information using any suitable communication technique, including, but not limited to, near-field communication, Bluetooth communication, radio-frequency identification (RFID) communication, wireless network communication (e.g., IEEE 802.11 communication), and cellular network communication. POS interface 210 may transmit account information across a network such as network 930 of FIG. 9.

Figure 3:
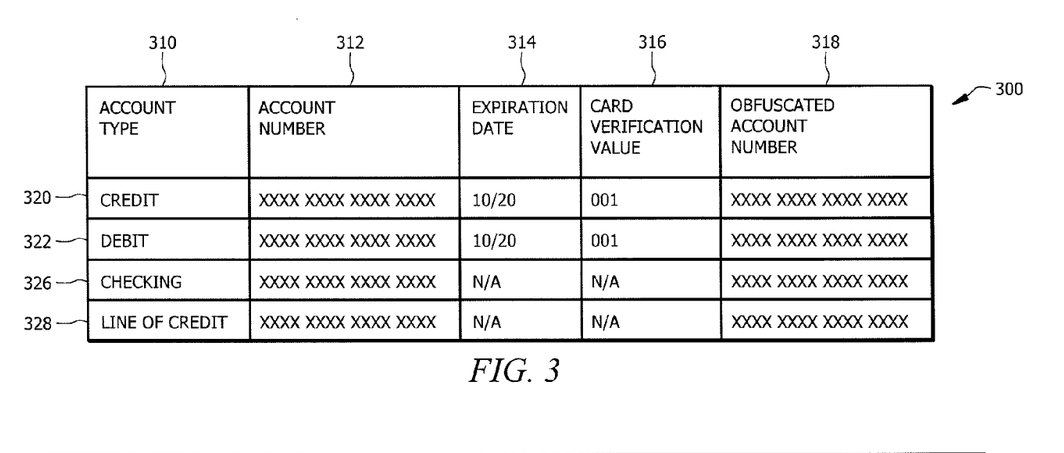
FIG. 3 shows a mapping table according to one example embodiment.

FIG. 3 shows a mapping table 300 according to one example embodiment. Mapping table 300 stores the relationship between obfuscated account numbers and permanent account numbers. Mapping table 300 shows example mapping data 132 that may be stored by obfuscation repository 130. In the example of FIG. 3, mapping table 300 includes the following fields: account type 310, account number 312, expiration date 314, card verification value 316, and obfuscated account number 318. Account type field 310 identifies a category of the account (e.g., credit, debit, checking, line of credit). Account number field 312 identifies the permanent account number of the account. Expiration date field 314 identifies the expiration date of the account or spending device (e.g., credit card expiration date), if applicable. Card verification value field 316 identifies a card security code, if applicable. For example, a credit card may have a card security code printed on the front or back that may be used for security purposes. Obfuscated account number field 318 identifies an obfuscated number associated with the permanent account number identified in account number field 312. In some embodiments, obfuscated account number field 318 stores the obfuscated account number provided by obfuscated number generator 116.

The example mapping table 300 features four accounts 320, 322, 324, and 326. Account 320 is a credit card account, account 322 is a debit card account, account 326 is a checking account, and account 328 is a line-of-credit account. In this example, each account has both a permanent account number and an obfuscated account number. In some embodiments, accounts 320, 322, 324, and 326 may be maintained by account manager 160 of FIG. 1.

Figure 4:
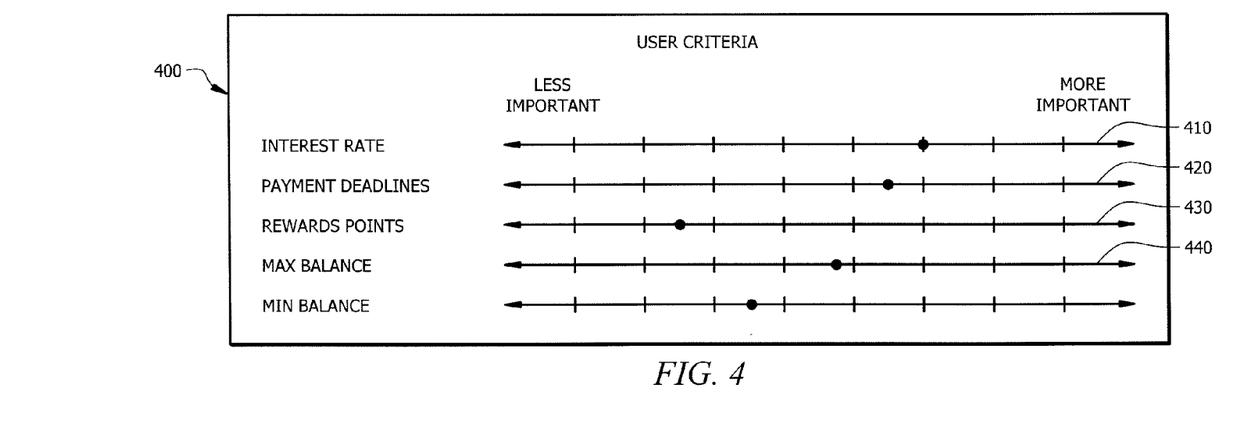
FIG. 4 shows a user criteria interface according to one example embodiment.

FIG. 4 shows a user criteria interface 400 according to one example embodiment. User criteria interface 400 provides an interface for a user 5, such as the customer, to provide user criteria on the existence, prioritization, and/or weights of account selection rules such as selection rules 172. User criteria interface 400 represents one example of a user criteria interface 182 that may be provided by management module 180 to user 5. In the example of FIG. 4, user criteria interface 400 includes five user criteria fields: interest rate criterion 410, payment deadlines criterion 420, rewards points criterion 430, maximum balance criterion balance 440, and minimum balance criterion 450.

User criteria interface 400 may allow user 5 to provide comparative weightings between various rules or other priorities. For example, interest rate criterion field 410 provides an input for user 5 to change the prioritization of interest rate when recommending an account. For example, prioritizing interest rate may instruct account selection engine 170 to prioritize those accounts with optimal interest rates. Payment deadlines field 420 provides an input for user 5 to change the prioritization of payment deadlines when recommending an account. For example, prioritizing payment deadlines may instruct account selection engine 170 to prioritize those accounts with later payment deadlines. Rewards points field 430 provides an input for user 5 to change the prioritization of rewards points when recommending an account. For example, prioritizing rewards points may instruct account selection engine 170 to prioritize those accounts that offer better rewards for a transaction. Maximum balance field 440 provides an input for user 5 to change the prioritization of maximum balance when recommending an account. For example, prioritizing maximum balance may instruct account selection engine 170 to prioritize those accounts that have outstanding balances lower than their required maximum balances. Minimum balance field 450 provides an input for user 5 to change the prioritization of minimum balance when recommending an account. For example, prioritizing minimum balance may instruct account selection engine 170 to prioritize those accounts with outstanding balances greater than their required minimum balances.

Figure 5:
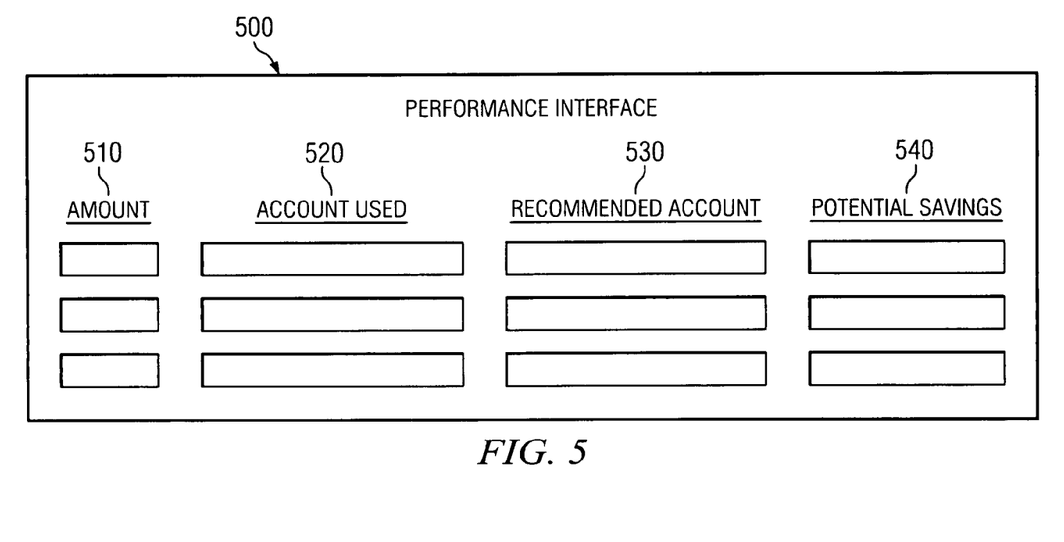
FIG. 5 shows a performance interface according to one example embodiment.

FIG. 5 shows a performance interface 500 according to one example embodiment. Performance interface 500 represents one example of a performance interface 186 that may be provided by management module 180 to user 5. In the example of FIG. 3, performance interface 500 includes the following fields: amount 510, account used 520, recommended account 530, and potential savings 540.

Amount field 510 identifies the amount actually spent by the customer during a transaction. Account field 520 identifies the account actually used by the customer during a transaction. Recommended account field 530 identifies the account recommended by account selection engine 170. In some circumstances, recommended account field 530 and account field 520 may identify the same account if the customer used the recommended account. In other circumstances, recommended account field 530 and account field 520 may identify different accounts if the customer did not use the recommended account. If the customer did not use the recommended account, potential savings field 540 identifies the savings the customer could have received by using the recommended account. In some embodiments, potential savings field 540 may identify the potential savings as a monetary value, a rewards points value, and/or a textual explanation of the potential savings.

Figures 6, 7:
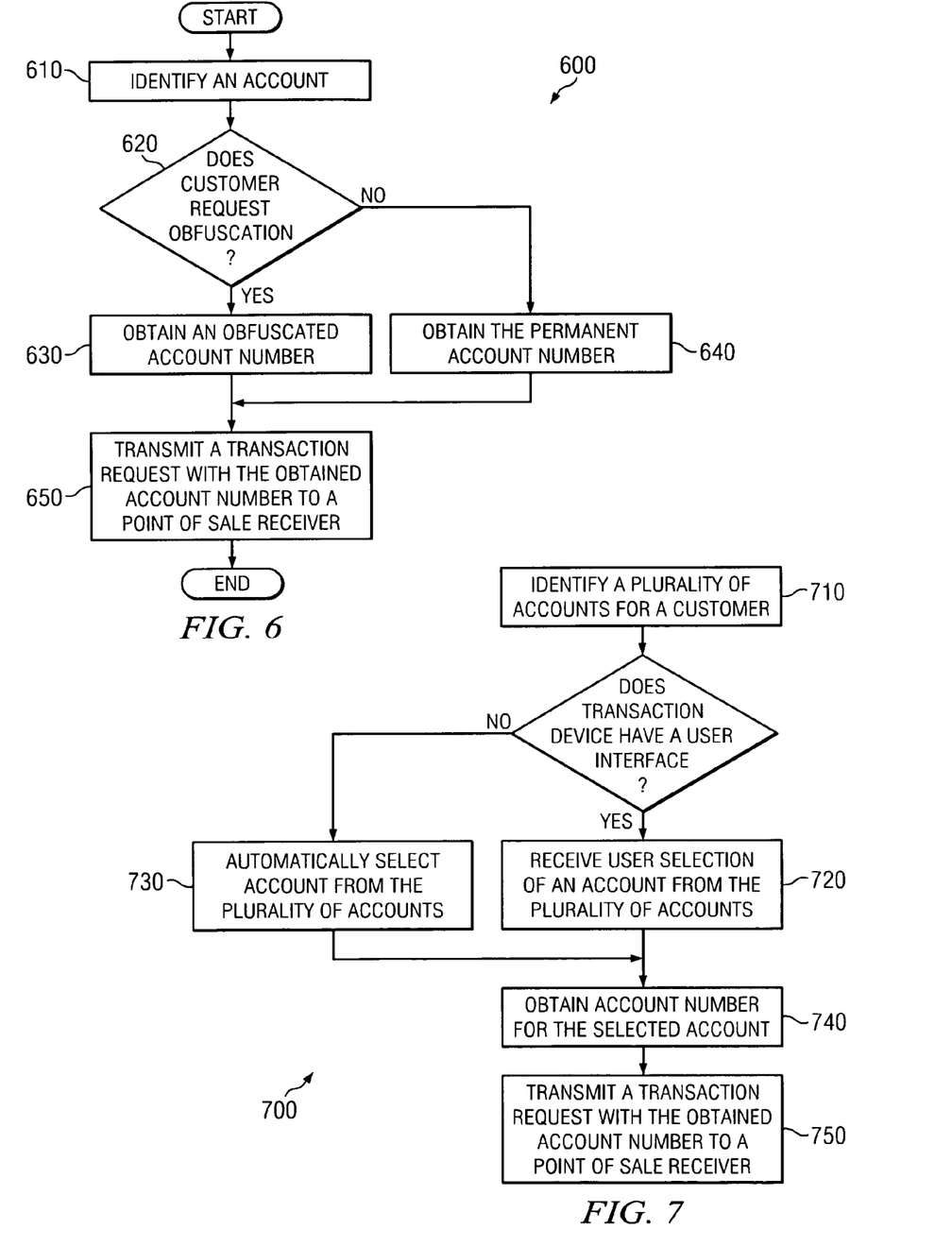
FIG. 6 shows an example method for performing a transaction between a customer and a merchant according to one embodiment.
FIG. 7 shows an example method for performing a transaction between a customer and a merchant according to one embodiment.

FIG. 6 shows an example method 600 for performing a transaction between a customer and a merchant according to one embodiment. At step 610, transaction device 110 identifies account 162. At step 620, transaction device 110 determines whether the customer requests obfuscation of the permanent account number for account 162. For example, transaction device 110 may receive a request to obfuscate through customer interface 114. As another example, the customer may instruct transaction device 110 on when to obfuscate through management module 180. If the customer requests obfuscation of the permanent account number, transaction device 110 obtains an obfuscated account number from obfuscated number generator 116 at step 630. If the customer does not request obfuscation of the permanent account number, transaction device 110 obtains the permanent account number for account 162 at step 640. At step 650, transaction device 110 transmits a transaction request with the obtained account number from steps 630 or 650 to POS receiver 142.

FIG. 7 shows an example method 700 for performing a transaction between a customer and a merchant according to one embodiment. At step 710, transaction device 110 identifies a plurality of accounts for a customer. If transaction device 110 has a user interface such as customer interface 114, then transaction device 110 may receive a user selection of an account from the plurality of accounts at step 720. If transaction device does not have a user interface such as customer interface 114, then transaction device 110 may automatically select an account from the plurality of accounts. In one embodiment, transaction device 110 may automatically select an account based on a recommendation from account selection engine 170. At step 740, transaction device 110 obtains the account number for the selected account. At step 750, transaction device 110 transmits a transaction request with the obtained account number to POS receiver 142.

Figure 8:
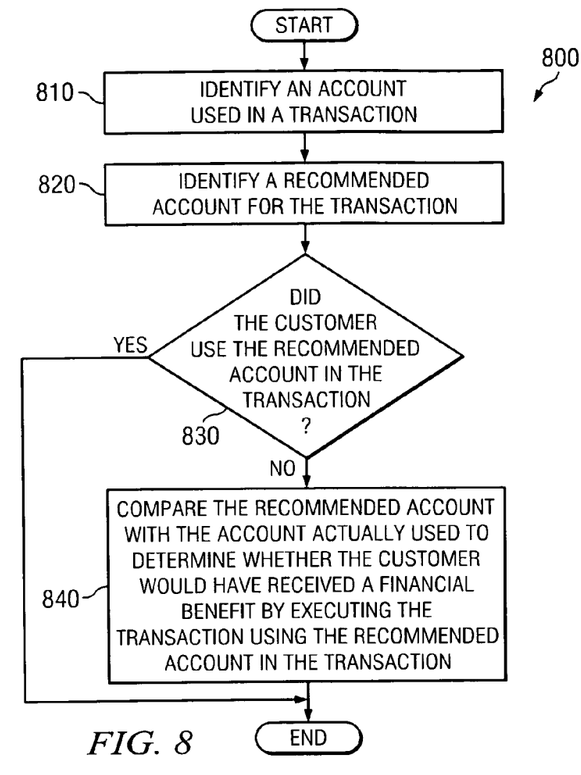
FIG. 8 shows an example method for evaluating a transaction between a customer and a merchant.

FIG. 8 shows an example method 800 for evaluating a transaction between a customer and a merchant. At step 810, transaction tracker 184 identifies an account used in a transaction. At step 820, account selection engine 170 recommends an account for the transaction. At step 830, performance interface 186 determines whether the customer used the recommended account for the transaction. If the customer used an account other than the recommended account, then performance interface 186 compares the recommended account with the account actually used to determine whether the customer would have received a financial benefit by executing the transaction using the recommended account in the transaction. For example, performance interface 186 may determine whether the customer would have saved money or received more rewards by using the recommended account instead of the account actually used in the transaction.

FIG. 9 shows a user 5, computer systems 910, and a network 930 according to one example embodiment. In this example embodiment, users 5 may interact with one or more computer systems 910, and computer systems 910 may communicate with each other across network 930.

Users 5 may include any individual, group of individuals, entity, machine, and/or mechanism that interacts with computer systems 910. Examples of users 5 include, but are not limited to, a teenager, parent, manager, executive, review board, accountant, engineer, technician, contractor, agent, and/or employee. Users 5 may be associated with an organization. An organization may include any social arrangement that pursues collective goals. One example of an organization is a family. Another example of an organization is a business. A business is an organization that provides goods or services, or both, to consumers, governmental entities, and/or other businesses.

Computer system 910 may include processors 912, input/output devices 914, communications links 916, and memory 918. In other embodiments, computer system 910 may include more, less, or other components. Computer system 910 may be operable to perform one or more operations of various embodiments. Although the embodiment shown provides one example of computer system 910 that may be used with other embodiments, such other embodiments may utilize computers other than computer system 910. Additionally, embodiments may also employ multiple computer systems 910 or other computers networked together in one or more public and/or private computer networks, such as one or more networks 30.

Processors 912 represent devices operable to execute logic contained within a medium. Examples of processor 912 include one or more microprocessors, one or more applications, and/or other logic. Computer system 910 may include one or multiple processors 912.

Input/output devices 914 may include any device or interface operable to enable communication between computer system 910 and external components, including communication with a user or another system. Example input/output devices 914 may include, but are not limited to, a mouse, keyboard, display, and printer.

Communication links 916 are operable to facilitate communication between computer system 910 and another element of a network, such as other computer systems 910. Communication links 916 may connect to any number and combination of wireline and/or wireless networks suitable for data transmission, including transmission of communications. Communication links 916 may, for example, communicate audio and/or video signals, messages, Internet Protocol packets, frame relay frames, asynchronous transfer mode cells, and/or other suitable data between network addresses. Communication links 916 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 918 represents any suitable storage mechanism and may store any data for use by computer system 910. Memory 918 may comprise one or more tangible, computer-readable, and/or computer-executable storage medium. Examples of memory 918 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 918 stores logic 920. Logic 920 facilitates operation of computer system 910. Logic 920 may include hardware, software, and/or other logic. Logic 920 may be encoded in one or more tangible, non-transitory media and may perform operations when executed by a computer. Logic 920 may include a computer program, software, computer executable instructions, and/or instructions capable of being executed by computer system 910. Example logic 920 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 920 may also be embedded within any other suitable medium without departing from the scope of the invention.

Various communications between computers 910 or components of computers 910 may occur across a network, such as network 930. Network 930 may represent any number and combination of wireline and/or wireless networks suitable for data transmission. Network 930 may, for example, communicate Internet Protocol packets, frame relay frames, asynchronous transfer mode cells, and/or other suitable data between network addresses. Network 930 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 930, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A transaction processing system for selecting an account for a transaction between a customer accessing a transaction device comprising a point of sale interface and a merchant having a point of sale receiver, the system comprising:

an account selection engine that:
receives information identifying a merchant name, a merchant category, a product name, a product category, and an amount of a proposed transaction;
identifies a plurality of accounts associated with the customer;
determines an account status of the plurality of accounts;
determines account selection criteria of the plurality of accounts;
determines a plurality of selection rules associated with the customer, the account status, and the account selection criteria, wherein each selection rule is associated with a prioritization category and the plurality of selection rules comprises at least one selection rule associated with a mandatory rule category, at least one selection rule associated with a preferential rule category, and at least one selection rule associated with an optimal rule category;
prioritizes the plurality of selection rules from the mandatory rule category, the preferential rule category, and the optimal rule category based on a monetary amount classification of the customer; and
selects a first account from among the plurality of accounts based on the at least one characteristic merchant name, the merchant category, the product name, the product category, and the amount of the proposed transaction, the account status, the account selection criteria, and the prioritization of the plurality of selection rules; and
a communication link that transmits identification of the first account to the point of sale interface of the transaction device, the point of sale interface transmits a transaction request to the point of sale receiver associated with the merchant, the transaction request comprising an account number associated with the first account.

2. The transaction processing system of claim 1, wherein the account selection engine and the communication link are housed within the transaction device.

3. The transaction processing system of claim 1, wherein the account selection criteria comprises at least one of the group consisting of an amount of rewards associated with using the first account, an amount of fees the customer will owe by using the first account, and an amount of interest the customer will owe by using the first account.

4. The transaction device of claim 1, wherein the plurality of accounts comprises the first account and a second account, the first account is associated with a first financial institution, and the second account is associated with a second financial institution different from the first financial institution.

5. A system comprising:
a memory that stores information identifying:
a merchant name, a merchant category, a product name, a product category, and an amount of a proposed transaction between a customer and a merchant;
a plurality of accounts associated with the customer;
an account status of the plurality of accounts;
account selection criteria of the plurality of accounts;
a plurality of selection rules associated with the customer, the account status, and the account selection criteria, wherein each selection rule is associated with a prioritization category and the plurality of selection rules comprises at least one selection rule associated with a mandatory rule category, at least one selection rule associated with a preferential rule category, and at least one selection rule associated with an optimal rule category; and a processor coupled to the memory, the memory including executable instructions that upon execution cause the system to:
prioritize the plurality of selection rules from the mandatory rule category, the preferential rule category, and the optimal rule category based on a monetary amount classification of the customer;
select a first account from among the plurality of accounts based on the merchant name, the merchant category, the product name, the product category, and the amount of the proposed transaction, the account status, the account selection criteria, and the prioritization of the plurality of selection rules; and
transmit identification of the first account to a point of sale interface of a transaction device, the point of sale interface transmits a transaction request to a point of sale receiver associated with the merchant, the transaction request comprising an account number associated with the first account.

6. The system of claim 5, wherein the memory and the processor are housed within the transaction device.

7. The system of claim 5, wherein the account selection criteria selected from comprises at least one of the group consisting of an amount of rewards associated with using the first account, an amount of fees the customer will owe by using the first account, and an amount of interest the customer will owe by using the first account.

8. The system of claim 5, wherein the plurality of accounts comprises the first account and a second account, the first account is associated with a first financial institution, and the second account is associated with a second financial institution different from the first financial institution.

9. A computerized method for selecting an account for a transaction between a customer and a merchant, comprising:
receiving, by an interface, information identifying a merchant name, a merchant category, a product name, a product category, and an amount of a proposed transaction between the customer and the merchant;
identifying, by a processor, a plurality of accounts associated with the customer;
determining, by the processor, an account status of the plurality of accounts;
determining, by the processor, account selection criteria of the plurality of accounts;
determining, by the processor, a plurality of selection rules associated with the customer, the account status, and the account selection criteria, wherein each selection rule is associated with a prioritization category and the plurality of selection rules comprises at least one selection rule associated with a mandatory rule category, at least one selection rule associated with a preferential rule category, and at least one selection rule associated with an optimal rule category;
prioritizing, by the processor, the plurality of selection rules from the mandatory rule category, the preferential rule category, and the optimal rule category based on a monetary amount classification one or more characteristics of the customer;
selecting, by the processor, a first account from among the plurality of accounts based on the merchant name, the merchant category, the product name, the product category, and the amount of the proposed transaction, the account status, the account selection criteria, and the prioritization of the plurality of selection rules; and
transmitting, by the interface, identification of the first account to a point of sale interface of a transaction device, the point of sale interface transmits a transaction request to a point of sale receiver associated with the merchant, the transaction request comprising an account number associated with the first account.

10. The computerized method of claim 9, wherein the account selection criteria selected from comprises at least one of the group consisting of an amount of rewards associated with using the first account, an amount of fees the customer will owe by using the first account, and an amount of interest the customer will owe by using the first account.

11. The computerized method of claim 9, wherein the plurality of accounts comprises the first account and a second account, the first account is associated with a first financial institution, and the second account is associated with a second financial institution different from the first financial institution.

12. The transaction processing system of claim 1, wherein the account status comprises at least one of the group consisting of a minimum account balance, a maximum account balance, and an amount of time between the time of the transaction and the time payment is due on the first account.

13. The transaction processing system of claim 1, wherein the monetary amount classification of the customer comprises at least one of the group consisting of a mass affluent customer, a low-income customer, and a teenager customer.

14. The transaction processing system of claim 1, the account selection engine further:
    determines user criteria selected by the customer, the user criteria comprising one or more weights of the plurality of selection rules, the weights being varied from less important to more important; and
    selects the first account from among the plurality of accounts based on the user criteria.

15. The system of claim 5, wherein the account status comprises at least one of the group consisting of a minimum account balance, a maximum account balance, and an amount of time between the time of the transaction and the time payment is due on the first account.

16. The system of claim 5, wherein the monetary amount classification of the customer comprises at least one of the group consisting of a mass affluent customer, a low-income customer, and a teenager customer.

17. The system of claim 5, the processor further:
    determines user criteria selected by the customer, the user criteria comprising one or more weights of the plurality of selection rules, the weights being varied from less important to more important; and
    selects the first account from among the plurality of accounts based on the user criteria.

18. The computerized method of claim 9, wherein the account status comprises at least one of the group consisting of a minimum account balance, a maximum account balance, and an amount of time between the time of the transaction and the time payment is due on the first account.

19. The computerized method of claim 9, wherein the monetary amount classification of the customer comprises at least one of the group consisting of a mass affluent customer, a low-income customer, and a teenager customer.

20. The computerized method of claim 9, further comprising:
    determining, by the processor, user criteria selected by the customer, the user criteria comprising one or more weights of the plurality of selection rules, the weights being varied from less important to more important; and
    wherein selecting, by the processor, the first account from among the plurality of accounts further comprises selecting, by the processor, the first account from among the plurality of account based on the user criteria.

* * * * *